United States Patent [19]

Maurer et al.

[11] Patent Number: 4,544,181

[45] Date of Patent: Oct. 1, 1985

[54] IDENTIFICATION CARD

[75] Inventors: Thomas Maurer, Munich; Wolfgang Gauch, Otterfing; Ludwig Devrient, Vaterstetten, all of Fed. Rep. of Germany

[73] Assignee: GAO Gesellschaft fur Automation und Organisation mbH, Munich, Fed. Rep. of Germany

[21] Appl. No.: 122,964

[22] Filed: Feb. 20, 1980

[30] Foreign Application Priority Data

Feb. 22, 1979 [DE] Fed. Rep. of Germany ....... 2907004

[51] Int. Cl.$^4$ ............................................. B42D 15/00
[52] U.S. Cl. ................................... 283/74; 283/94; 283/904; 346/76 L; 346/135.1
[58] Field of Search .................. 283/7, 74, 75, 85, 86, 283/91, 904; 40/2.2; 235/487, 494; 400/118; 346/135.1, 76 L, 76 R

[56] References Cited

U.S. PATENT DOCUMENTS

| 3,351,948 | 11/1967 | Bonn | 346/76 L |
|---|---|---|---|
| 3,571,957 | 3/1971 | Cumming | 283/7 |
| 3,640,009 | 2/1972 | Komiyama | 283/7 X |
| 3,665,483 | 5/1972 | Becker et al. | 346/76 L X |
| 3,827,726 | 8/1974 | McVoy | 283/7 |
| 3,832,948 | 9/1974 | Barker | 346/76 L X |
| 3,889,272 | 6/1975 | Lou et al. | 346/76 L X |
| 3,894,756 | 7/1975 | Ward | 283/7 |
| 3,897,964 | 8/1975 | Oka et al. | 346/135.1 X |
| 3,921,318 | 11/1975 | Calavetta | 283/7 X |
| 3,945,318 | 3/1976 | Landsman | 346/76 L X |
| 3,959,799 | 5/1976 | Gambino et al. | 346/76 L X |
| 4,007,462 | 2/1977 | Wetsel, Jr. | 283/904 X |
| 4,335,198 | 6/1982 | Hanada et al. | 346/135.1 X |

FOREIGN PATENT DOCUMENTS

| 695406 | 8/1940 | Fed. Rep. of Germany . | |
| 1499422 | 3/1973 | Fed. Rep. of Germany . | |
| 2446962 | 8/1976 | Fed. Rep. of Germany | 400/118 |
| 2240553 | 9/1978 | Fed. Rep. of Germany . | |
| 2815708 | 10/1979 | Fed. Rep. of Germany | 283/7 |
| 2299972 | 9/1976 | France . | |

Primary Examiner—Paul A. Bell
Attorney, Agent, or Firm—Neuman, Williams, Anderson & Olson

[57] ABSTRACT

The invention relates to a multi-layered identification card comprising a card core laminated between cover sheets with user information appearing on the card inlet. At least one of the cover sheets is transparent. The information is provided on the inlet by means of a laser beam being controlled accordingly so as to protect against forgery. When producing the card the information is provided onto the inlet through the transparent cover sheet.

8 Claims, 5 Drawing Figures

IDENTIFICATION CARD

FIELD OF THE INVENTION

The invention relates to an identification card, comprising two cover sheets of which at least one is transparent, and a card core or inner layer of an opaque material, in particular paper, which is provided with information which can be perceived visually through said transparent cover sheet.

DESCRIPTION OF THE PRIOR ART

In connection with the production of identification cards there is an underlying, basic need to protect these as far as conceivably possible from being forged and/or counterfeited in entirety.

The term forgery is defined as an alteration in the card information, such as the personal particulars of the owner of the card, the photograph of the owner and the data of the issuing authority, whereas a counterfeit in entirety, also known as a total counterfeit, is understood to mean the complete imitation of a card.

In order to aggravate or prevent total counterfeiting, the card core—i.e. the opaque inner layer or substrate upon which the variable data are subsequently provided—can be safeguarded by a number of different measures and by employing a number of different techniques which are known from the printing of security documents or banknotes. For instance, it is possible to produce a paper-laminated identification card whose card inlet consists of watermarked paper. True watermarks form during the paper production in special paper machines and permit the positioned or continuously running reproduction of multistage motives. It is also possible to print the card core, which in addition to the above-described watermarked paper can also consist of plastics or other materials, with what are termed guilloches in several colors, a technique which is also known from the printing of securities. While the aforementioned features can be examined and checked in the visual charge, it is also possible to equip the card core with invisible hallmarks. The highly sophisticated technology of safeguarding securities from total counterfeiting, which has only be mentioned briefly here, enhances the security of identification cards with respect to total counterfeiting considerably because the amount of time and energy expended in counterfeiting or forging the document exceeds by far the gains which can be expected.

The known methods, however, only make it possible in principle to provide hallmarks which are at all times identical and thus uniform for all identification cards and which can be correspondingly altered depending on the wishes of the user and the various applications and aims of the identification cards. In addition to these hallmarks, identification cards also include as a rule variable information such as the personal particulars of the card owner, his photograph and other data specific to his person. To prevent this information from being forged, steps are generally taken to ensure that access to the variable information contained on the identification card is virtually nonexistant and the successful alteration of the same is virtually impossible. If changes are nonetheless made on the card, these should be easily recognizable so that manipulation of the card will become completely useless to the forger. It is known from the former technology of identification card manufacture, for example, that those elements which are intended to prevent total counterfeiting in the printing of the card core can also be utilized to identify and reveal manipulation or alteration in the variable information on the identification card. The guilloches which were mentioned above and which consist of very fine lines, for example, serve to render erasures made on the card information visible owing to the fact that, in so doing, the guilloches are destroyed at these sites.

As far as the forgery safeguarding aspect is concerned, the so-called polylaminated identification card has proved to be valuable. A card core which can consist either of paper or of plastic or of any other material which is printed with a safety background similar to securities in order to render a total counterfeit or a forgery impossible, is laminated between two cover sheets. The visual authenticity examination of the identification card is facilitated by additionally providing a photograph in the interior of the identification card, thereby additionally enhancing the forgery safeguarding aspect.

A fundamental differentiation is made in the manufacture of such identification cards between central and decentral processes.

In the case of central card manufacture, all operations including the entry of the personal data of the respective owner of the identification card as well as the lamination of the blanks are performed by the manufacturer of the identification cards.

The advantage of this system is to be seen in the fact that access to unpersonalized and unlaminated identification cards, which would facilitate unauthorized tampering with the cards, can be excluded almost entirely. The drawback of this system, however, is the fact that all identification cards must be personalized and, if desired, equipped with photographs at the place where they are manufactured. This results in very high personal expenses and makes short-term measures—relating to regional distribution and card quantities—well-nigh impossible in the case of very voluminous identification card systems. The unscheduled manufacture of a small number of identification cards is therefore expensive and very time-consuming in the case of this system. Furthermore, it is necessary in this manufacturing process to transfer the personal data required to produce the identification card from the applicant, i.e. the issuing authority for instance, to the card manufacturer, thus making these data accessible in compiled form to a larger circle of persons.

The decentral process is characterized in that the card core is manufactured centrally. The entry of the personal data as well as the subsequent lamination of the identification cards is performed decentrally by the applicant, e.g. in regionally distributed issuing offices.

One advantage of this process is that the manufacture of identification cards is possible at any time, even in smaller quantities, and that the transfer of personal data, which is necessary in the case of the central process, is unnecessary in this case.

The disadvantage is the widely distributed storage of unpersonalized card cores which thus enhances the general security risk and which may necessitate greater security regulations in many locations owing to the risk of theft.

Since expensive laminating devices are necessary to laminate the identification cards, the cores are personalized by the applicant, but the cards are laminated by the manufacturer of the identification cards in a combined form of both systems. From an economical point of view, the results in a few advantages, although the security risk is additionally enhanced by sending the unlaminated identification card cores back and forth twice.

The identification card can also be additionally equipped with a machine readable data carrier. The most frequent form today is a magnetic strip on the obverse side of the identification card. This data carrier must also be inscribed at the same time the personal data are provided.

Since this inscription takes place on the finished identification card, whereas the visually readable data have already been provided on a prefabricated product, the association of both sets of data is very difficult on account of the intervening production stages (lamination, punching, packaging). Compliance with this requirement requires a very high expenditure of manufacturing technology.

Yet another process for manufacturing identification cards is known in which unpersonalized, completely laminated identification cards are provided with personal data by embossing these on the surface thereof. The card is embossed, the embossed indicia are dyed and the magnetic strip located on the card is inscribed in one single operation. Although the identification cards can be provided with the personal data in this process both by the manufacturer and by the user of the identification cards, it is in no case necessary in this operation to send unlaminated card blanks through the mails. The resultant advantage, however, must be purchased at the cost of a number of serious, additional disadvantages.

Since the personal data are provided by embossing the surface of the cover sheet, the data are readily accessible and thus subject to a greater chance of being forged.

In order to improve the legibility of the data, the raised portions of the embossed information are dyed. This dye, however, is subject to much wear precisely in this area so that the legibility of the data varies considerably and changes constantly in the course of time. The use of such cards in automatic optical card readers is thus out of the question. Moreover, the universal use of this type of card is also impossible due to absence of any possibility of providing photographs in the interior of the identification card.

Finally, it should be mentioned that the identification cards are subjected to greatly fluctuating loads during the embossing operation which as a rule result in a deformation of the card body. Apart from the resultant difficulties of packing, storing the cards, etc., the use of these identification cards involves many difficulties even in general automatic identification card inspection devices, e.g. for reading magnetic data.

It is known in principle (German patent specification No. 1,499,422) to use the energy of laser beams to evaporate or even burn materials which absorb this energy to a greater or lesser degree. In the afore-quoted publication, the energy of the beam is used to burn a card code into a recording carrier (punched tape) which is enclosed between transparent substrates and which absorbs the irradiation, without destroying the substrate layers. The special advantage of this use of the laser is seen in the fact that the data supplied by the computer of a data processing unit can be processed in real time by virtue of the high processing speed of the computer.

SUMMARY OF THE INVENTION

The object of the invention is to provide an identification card and a process for the production of the same which makes it possible to inscribe individual features, in particular personal data, in the interior of said card after lamination of the card blank. This is intended to facilitate both central and decentral completion of the identification cards without increasing the security risk.

This object is accomplished in accordance with the invention in that the information is provided on the core of the identification card through the transparent cover sheet which has already been laminated onto the card by means of a controlled laser beam. The invention thus avails itself of the principle which is already known per se for providing identification cards with the necessary information. In so doing, a number of advantages surprisingly result owing to this special use.

The identification card can be completed except for the information to be provided with the laser beam, i.e. the card can also be laminated, thereby protecting it from manipulation or tampering to a far greater extent than with unlaminated card cores, should they fall into the wrong hands.

At the same time as the information is provided on the core of the card by means of the laser beam, it is possible to concurrently mark the cover sheet which is then accessible to manual inspection by virtue of the resultant, permanent relief-type structure on the cover sheet. In addition, this results in these areas in greater partial fusion of the cover sheet and card core, thereby intimately bonding the sites treated with the laser beam with the cover sheet itself. This makes it impossible to remove the information without visibly damaging the cover sheet (the inscription on the card core and on the cover sheet are of course in register).

Since the sites treated with the laser beam are located inside the card, so to speak, owing to the localized burning of the core—the extent to which the core is burned being adjustable in a simple manner—thus making them an element of the card core, these data cannot be altered without destroying the core material itself.

One essential advantage in the manufacture of identification cards for use in automats is finally that both the machine readable personal data of the card which are located on the magnetic strip as well as the visible card information, including the photograph if desired, can be placed on the card in one single operation. In accordance with the invention, the process possesses the organizational advantages associated with the embossing process. It not only avoids the security drawbacks associated therewith, however, but also offers substantially greater security and protection from forgery and counterfeiting compared to merely inscribing the paper core.

Another advantage of the invention can be seen in the fact that in addition to the afore-mentioned photograph, a valueable security individuality accessible to visual inspection can be imparted to each and every card, e.g. when providing the personal data to the card, each card is also provided with a symbol which is specific for the card owner or the identification card, or a pattern which varies either from card series to card series or even from card to card can be provided at some later date on the information already placed on the card core.

Particularly when using patterns which vary from card to card, the information exhibited in this pattern can be employed not only as a visual hallmark, but also to safeguard the data on the magnetic strip. The pattern is scanned with an appropriate optical scanning means along a predetermined track on the identification card with subsequent processing of the scanning signals and scrambling of the individual data with the data recorded on the magnetic strip. The signals are scanned and processed in a manner similar to the scanning of individual magnetic data as already known, for example, from German laying-open print DE-OS No. 2,635,795.

A pattern which varies from series to series, on the other hand, serves preferably to increase the manufacturing costs for forgers and also permits visual inspection of the authenticity of the card.

Owing to the possibility of being able to provide guilloche- and stamp-like or other types of patterns, alphameric data and picture information on the completely laminated identification card, the range of applications is expanded to all cases conceivable in practice.

Advantageous further developments of the invention are the subject matters of the subclaims.

BRIEF DESCRIPTION OF THE DRAWING

An embodiment of the invention will now be described in the following with reference to the enclosed drawing, in which by way of example.

DESCRIPTION OF THE PREFERRED EMBODIMENT

Figure 1:
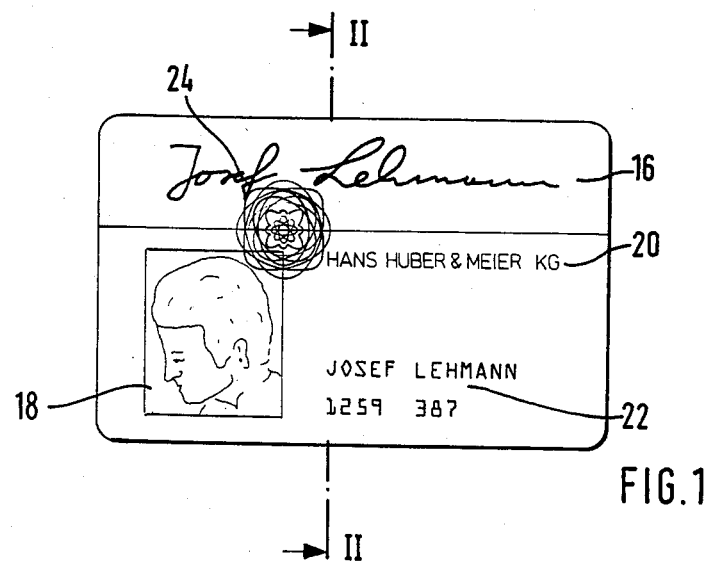
FIG. 1 is a view of the identification card.
Figure 2:
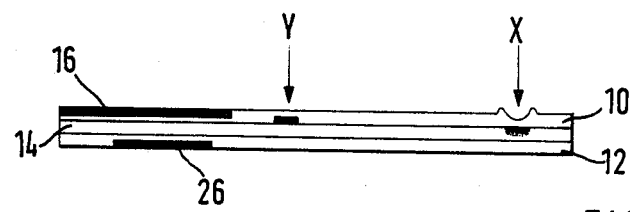
FIG. 2 is a cross section through the identification card.

The identification card illustrated in FIGS. 1 and 2 is termed a polylaminated identification card consisting of two cover sheets 10, 12 and a card core or inner opaque layer 14. At least the upper cover sheet 10 is designed to be transparent so that the information provided on the core can be perceived visually. Since the control of the laser printer can be varied almost arbitrarily without mechanical intervention by a computer program, the type face can be freely chosen by appropriately adapting the control program. In the present case, alphanumeric OCR (optical character recognition) print was employed so that, in addition to being readable visually, it is also possible to process the data by computer by using an optical OCR reader. A signature strip 16 is laminated onto the cover foil and can be inscribed with a normal writing instrument.

A photograph 18 and two data areas are provided on the inlet 14, the data area 20, for example, including the name of the issuing authority and the data area 22 including the personal data of the client. Moreover, one portion of the core in the embodiment illustrated is provided with a pattern 24 individual for this card and applied by means of a laser beam. The pattern is arranged such that it covers a portion of the photograph, the general paper core as well as areas of the signature strip as well. Since the graphic structure of the pattern and, if desired, the location of the pattern are varied from card to card, it is thus possible for the first time ever to visually inspect the matching relation of these partial card areas in a very simple way. The pattern is located in the area of the signature strip 16 not on the core, but rather is continued onto the surface of the signature strip. If there is no signature strip, the pattern can of course also cover the entire paper core and can be easily varied from card to card as well, thereby making it more difficult to forge the identification card. The pattern has a stamp-like structure in the present example. Another design such as a guilloche-like structure or the like is also possible.

A magnetic strip 26 is laminated onto the underside of the cover sheet 12 and includes data which concur with the data provided by means of the laser beam in addition to other data necessary to permit the identification card to be computer-processed.

The alphameric indicia are printed on the card core 14 by burning them into the surface thereof or appropriately blackening the same. As will be described in the following, the data is printed by means of an appropriately controlled laser beam. Depending on the energy quantum of this laser beam, the upper cover sheet 10 can be melted concurrently in such a way that a relief is formed above the line of printed information and in register therewith which can also be felt manually. An example is indicated by arrow X.

If the card core is coated with a suitable substance capable of causing a thermochemical reaction, irradiating the layer with the laser does not have to cause a blackening or destruction of the core, but merely a change in color. The background pattern 24 is preferably designed such that it appears in lines of another color, using this color change principle, in contrast to the burned-in indicia in the data strips 20 and 22. A background pattern such as background pattern 24 may be printed on the card inlet 14 by means of conventional printing technology. Arrow Y in FIG. 2 designates such a site on the card core which stands out against the surrounding field solely due to a color change. Examples of such thermosensitive materials are well-known to the person skilled th the art. Suitable substances are cited in German patent specification No. 695,406, for instance, which exhibit a color change from white to brown, from pink to blank, from yellow to red-brown, etc. when irradiated with an appropriately adjusted laser. An arbitrary selection from a number of the known substances can be made in accordance with the respective requirements. When working with heat-laminated identification cards, however, the priorities in selecting the respective substances must be laid down such that the color change occurs at a temperature above the laminating temperature. Since the laminating temperature does not exceed 180° C. as a rule in conventional laminating devices, the range of dyes which can be employed is only insignificantly restricted. Moreover, polychromatic designs are possible using only one single substance by choosing dyes which have several color transition temperatures and by appropriately adjusting the laser.

The cover sheets preferably consist of plastics, e.g. PVC, with a thickness of 0.05–0.5 mm, for example. The card core is preferably white paper with a substance of 70–120 g/m³. Both cover foils are as a rule hot-laminated onto the card core due to the simultaneous action of pressure and heat, as already described hereinbefore. Devices for such laminating operations are well-known.

The identification card, of course, does not have to include all individualizing features shown here. For instance, the background pattern 24 or even the photograph 18 may be omitted. On the other hand, however, other features not shown here may also be provided by means of the laser beam without departing from the scope of the invention.

Figure 3:
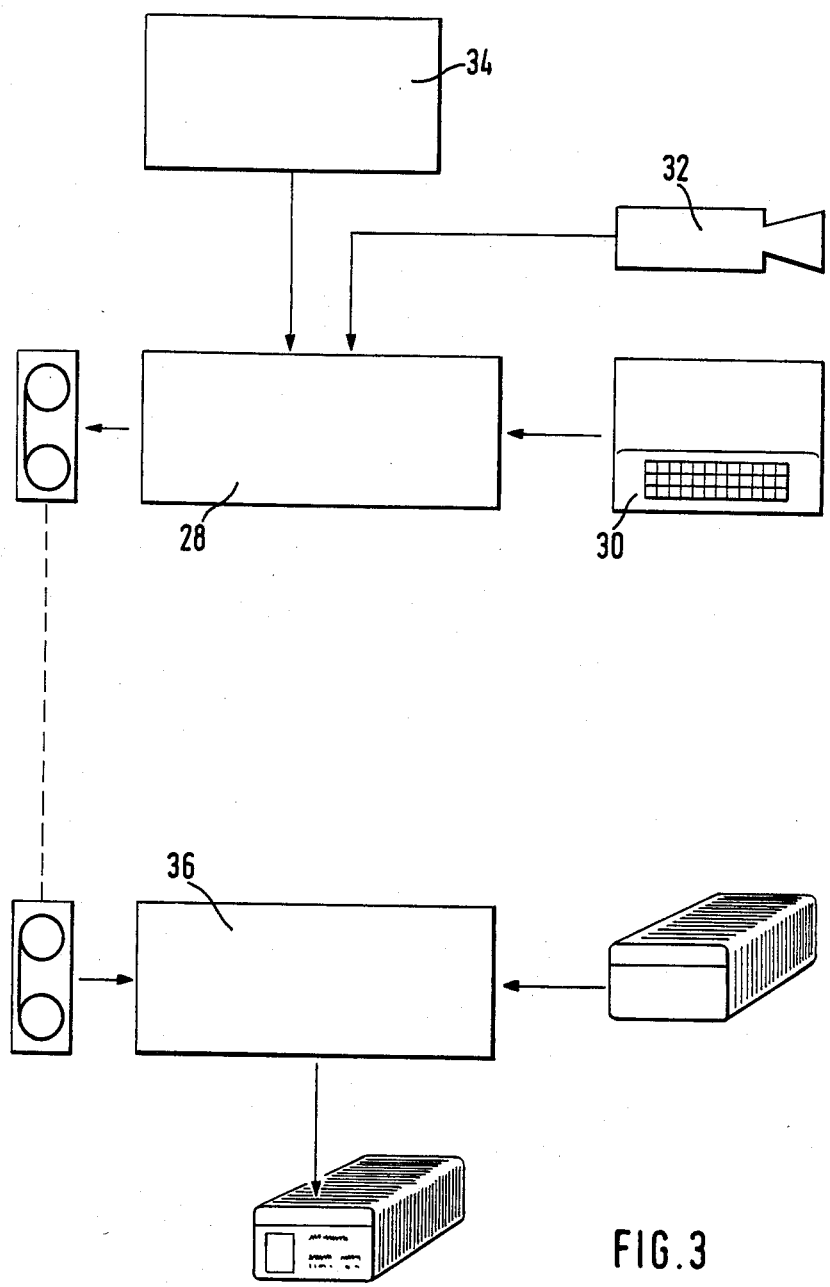
FIG. 3 is a flow diagram of the system for providing personal data on the identification card.

The set-up for what is termed personalizing the identification cards will now be explained with reference to FIG. 3.

A magnetic tape, e.g. a magnetic tape cassette, as is known from video engineering is inscribed with specific information in a data tape coding machine. The client data and, if desired, even the data of the issuing authority can be supplied to the coding machine 28 by means of a data input unit 30 with an appropriate keyboard. Furthermore, the picture of the card owner is recorded by a video camera 32 on the magnetic tape in the coding unit as a mosaic picture comprising many shades of gray. Such storage of video pictures is already known. Finally, the coding unit 28 can be supplied with information concerning a particular, e.g. guilloche-like pattern, a specific configuration, for example, be related to a specific company. The pattern is input via an auxiliary unit 34. The data tape contains additional instructions concerning the respective positioning of the information on the identification card. When manufacturing larger series of identical identification cards, it can also be meaningful to supply the information about the additional pattern (pattern memory 34) not via the data tape coding unit and thus via the magnetic tape, but rather directly by way of the identification personalization unit which will be described in the following.

The data tape is evaluated in a downstream identification personalization unit 36 and a card blank is inscribed accordingly.

The identification personalization unit must not be located at the same place as the data tape coding unit 28. The data tape coding machine, for example, can also be in a branch office of a firm, the completed data sheets in this case being forwarded to the company headquarters where the card blanks are personalized centrally. The identification cards which are then returned to the company branch offices are those identification cards which have been personalized completely and therefore are forgery-proof. It is also possible, however, to combine the identification personalization unit 36 with the data tape coding unit 28 to form one system so that, when the appropriate card blanks are at hand, the completely personalized identification cards can be made right there.

The structure of the personalization unit 36 will now be explained in detail with reference to FIG. 4.

The magnetic tape is first read in a cassette reader 38, e.g. a magnetic tape unit for video cassettes, and the signals are supplied to a control computer 40. A suitable computer is available, for example, from the company Hewlett Packard and is designated as the System 3000.

The computer 40 is connected to a control unit 46 for controlling the card transport unit 44, to a control unit 48 for controlling the laser and finally to a recording unit 50 for recording the magnetic data. The latter unit is not obligatory, and is only provided if the identification cards include a magnetic strip. If in addition to recording the general magnetic strip data, the individual pattern provided by the laser printer is examined and the derived information is concurrently employed when coding the magnetic strip, a scanning element 55 must be provided on the laser side which scans the optical pattern on a predetermined track and simultaneously processes the scanning signal via the magnetic data recording device 50.

The control unit 48 for controlling the laser controls the intensity of the laser on the one hand and the beam deflection unit on the other hand. Both are combined in block 52 in FIG. 4 for the sake of simplification.

Figure 5:
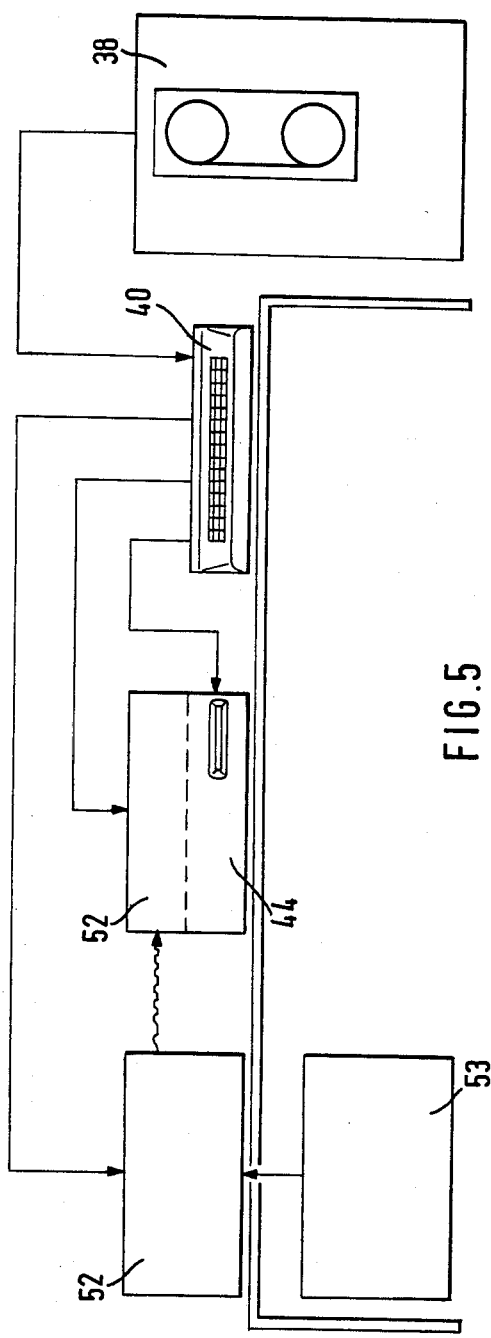
FIG. 5 is a schematic illustration of the components of the system and their functional association.

FIG. 5 depicts the units once again in their spatial and functional arrangement. The laser and deflection unit are separate components.

A system consisting of a laser, deflection unit and appropriate energy supply 53 for the laser is available commercially from the company Siemens under the name Silamatic.

Figure 4:
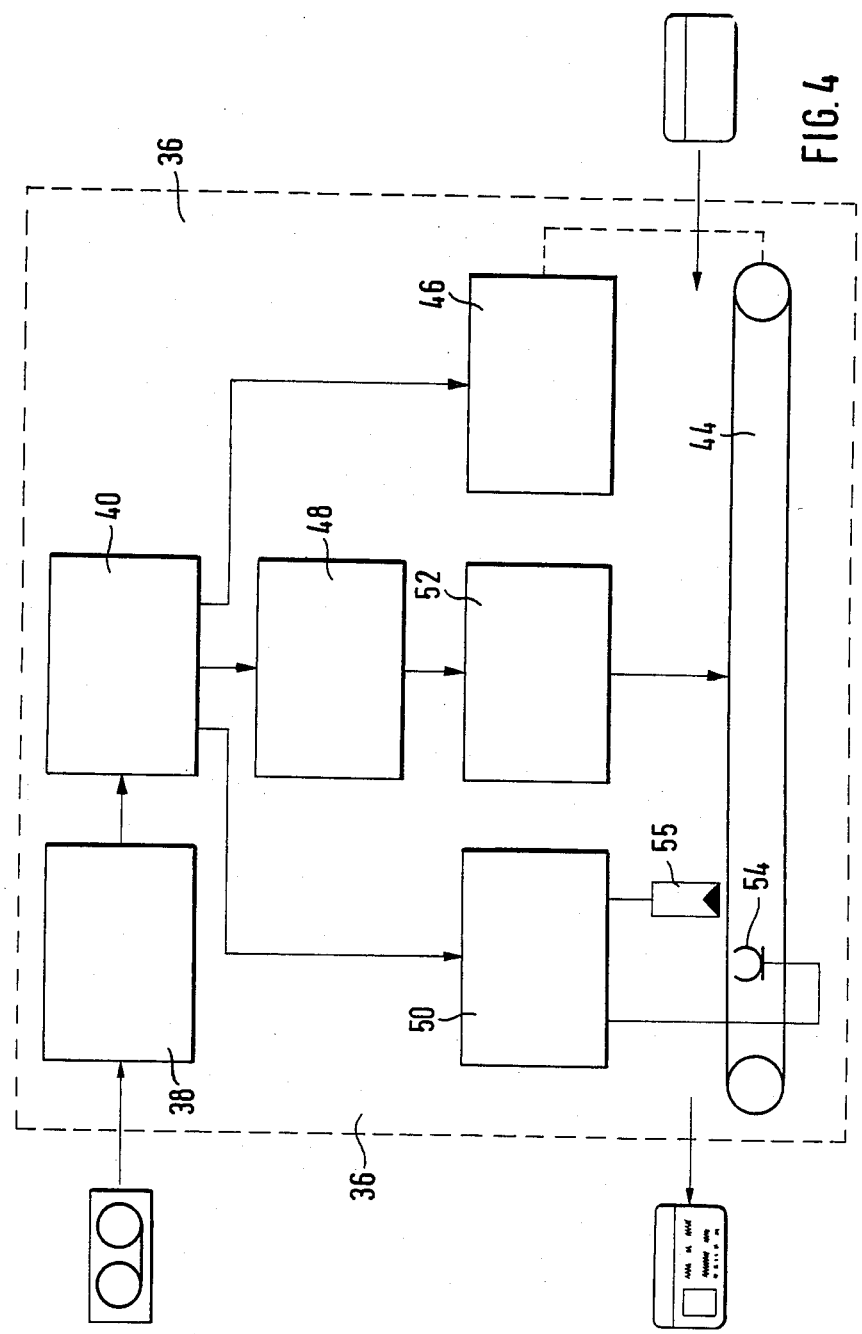
FIG. 4 is a block diagram of the personalizing apparatus.

The identification cards are personalized as follows (FIG. 4). The card blank is introduced into the card transport system and synchronized by the control unit 46 positioned beneath the deflection unit 52 of the laser. The laser beam now inscribes the client data, data of the issuing office and, if desired, a photograph at the predetermined sites on the identification card depending on the information stored. Special importance must certainly be attributed to the possibility of providing a photograph as an individual characteristic directly on the paper core in a manner such as to make it inseparable therefrom. The picture is "burned" into the paper core as a mosaic picture with many shades of gray. The corresponding technology is already known and thus not a subject matter of the instant invention.

The card can be covered with a pattern of fine lines either prior or subsequent to the inscription of the variable data. If the paper core is coated with a thermosensitive material, these fine lines can also be rendered visible in the form of color changes, whereby the density of the laser beam energy must be reduced appropriately. If the thermosensitive material is deposited onto the core in the form of a grid, for example, rows of fine dots will be formed as the laser beam passes over this grid. There are almost no limits as far as the conceivable card designs and configurations are concerned.

After the identification card has been personalized in this way, it is advanced by the card transport system 44 to a magnetic head 54 which, if desired, inscribes the magnetic strip 26 of the identification card with the appropriate data. The data preferably correspond to the data of the issuing office and the client data which has been visually inscribed by the laser so that the identification card can be processed by machine in the known manner.

As already mentioned hereinbefore, the identification card does not have to contain all of the information and features mentioned. It may be sufficient for simple cases to provide the cards solely with the personal data of the user. Changes involving the number, form and positioning of the information can be made as desired.

It goes without saying that the term identification card is understood to include all cards of similar structure such as identity cards, credit cards, check cards, membership cards, passports and similar documents.

What is claimed is:

1. In a multilayer identification card, comprising two cover sheets at least one of which is transparent and an opaque card core laminated between the cover sheets and provided with visually perceptible information defined by patterns, letters, numbers and/or pictures, the improvement comprising the presence of said information in the card core in the form of localized, visible, thermally and irreversibly degraded core portions formed in said core by means of a laser beam traversing the transparent cover sheet subsequent to core lamination to said cover sheet, whereby the information is also formed in said cover sheet in register with and simultaneously with the information in the card core.

2. A multilayer identification card according to claim 1 whereby the opaque card core is made of paper and the information is present in form of dark markings caused by a partial burning of the paper material of the card core.

3. A multilayer identification card according to claim 1 in which the information on said transparent cover sheet is in relief and can be sensed by touch.

4. A multilayer identification card according to claim 1 in which the information comprises pictures formed by printing a grid of laser-sensitive material on said card core whereafter said grid is exposed to a laser beam resulting in a picture formed of dots comprising said grid.

5. A multilayer identification card according to claim 1 in which the information is superimposed on a background pattern printed on the card core by means of conventional printing techniques.

6. A multilayer identification card according to claim 5 in which the background pattern is printed with thermosensitive material so that the places in which the background pattern overlaps with the pattern of information show a recognizable color change.

7. A multilayer identification card according to claim 1 in which the information comprises pictures defined by shades of gray resulting from controlled burning by a laser beam of the card core.

8. A multilayer identification card according to claim 1 or 3 in which the information overlaps with a signature strip laminated onto the identification card.

* * * * *

UNITED STATES PATENT AND TRADEMARK OFFICE
CERTIFICATE OF CORRECTION

PATENT NO. : 4,544,181

DATED : Oct. 1, 1985

INVENTOR(S) : Thomas Maurer et al

It is certified that error appears in the above-identified patent and that said Letters Patent is hereby corrected as shown below:

Column 5, line 55 and column 6, line 33, "inlet" should be -- core --. On the title page under the heading "U.S. Patent Documents" the following U.S. reference should be listed:
 4,069,487 1/1978 Kasai, et al.......G01G15/34.
On the title page under the heading "Foreign Patent Documents" the following should be listed:
 2247034 9/1972.......Fed. Rep. of Germany
 613161 9/1979 ......Switzerland Signed and Sealed this First Day of July 1986

[SEAL]

Attest:

DONALD J. QUIGG

Attesting Officer

Commissioner of Patents and Trademarks